United States Patent
Hwang et al.

(10) Patent No.: US 9,866,551 B2
(45) Date of Patent: Jan. 9, 2018

(54) ONE TIME PASSWORD GENERATION DEVICE AND AUTHENTICATION METHOD USING THE SAME

(71) Applicants: Young Man Hwang, Goyang-si (KR); Sung Min Joo, Paju-si (KR)

(72) Inventors: Young Man Hwang, Goyang-si (KR); Sung Min Joo, Paju-si (KR)

(*) Notice: Subject to any disclaimer, the term of this patent is extended or adjusted under 35 U.S.C. 154(b) by 89 days.

(21) Appl. No.: 14/751,198

(22) Filed: Jun. 26, 2015

(65) Prior Publication Data

US 2015/0379260 A1    Dec. 31, 2015

(30) Foreign Application Priority Data

Jun. 26, 2014  (KR) ................. 10-2014-0078684

(51) Int. Cl.
  *H04L 29/06*  (2006.01)
  *G06F 21/31*  (2013.01)
  *H04L 9/32*   (2006.01)

(52) U.S. Cl.
  CPC .......... *H04L 63/0838* (2013.01); *G06F 21/31* (2013.01); *G06F 2221/2115* (2013.01); *H04L 9/32* (2013.01)

(58) Field of Classification Search
  CPC ................ H04L 63/0838; G06F 21/31; G06F 2221/2115
  See application file for complete search history.

(56) References Cited

U.S. PATENT DOCUMENTS

| | | | | |
|---|---|---|---|---|
| 9,172,698 | B1* | 10/2015 | Evans ................. | H04L 63/0853 |
| 2006/0206919 | A1* | 9/2006 | Montgomery .......... | G06F 21/31 726/2 |
| 2007/0250934 | A1* | 10/2007 | Park ....................... | G06F 21/36 726/26 |
| 2007/0271596 | A1* | 11/2007 | Boubion ................ | G06F 21/35 726/3 |
| 2009/0106827 | A1* | 4/2009 | Cerruti .................... | G06F 21/31 726/7 |
| 2009/0178135 | A1* | 7/2009 | Dubovsky ............... | G06F 21/36 726/18 |
| 2012/0144461 | A1* | 6/2012 | Rathbun ............... | H04L 9/3213 726/5 |
| 2012/0323717 | A1* | 12/2012 | Kirsch ............... | G06Q 20/0855 705/26.1 |
| 2013/0047238 | A1* | 2/2013 | Hwang ................ | H04L 9/3228 726/7 |
| 2013/0167196 | A1* | 6/2013 | Spencer ................. | H04W 8/22 726/3 |

(Continued)

FOREIGN PATENT DOCUMENTS

| | | |
|---|---|---|
| KR | 10-1204980 B1 | 11/2012 |
| KR | 10-1272349 B1 | 6/2013 |
| KR | 10-1359874 B1 | 2/2014 |

*Primary Examiner* — Carl Colin
*Assistant Examiner* — Gary Lavelle

(57) ABSTRACT

Disclosed are a one time password generation device and an authentication method. The one time password generation device includes: a reference information generator that generates reference information; a virtual input means generator that generates a virtual input means in which a blank is provided; and a password generator that generates a one time password using an initial value, reference information and a blank.

19 Claims, 3 Drawing Sheets

(56) References Cited

U.S. PATENT DOCUMENTS

2013/0333010 A1* 12/2013 Chougle ................ G06F 21/46
                                                      726/7
2014/0201831 A1*  7/2014 Yi ........................ G06F 21/31
                                                      726/19
2015/0101053 A1*  4/2015 Sipple ................ H04L 63/1425
                                                      726/24

* cited by examiner

ONE TIME PASSWORD GENERATION DEVICE AND AUTHENTICATION METHOD USING THE SAME

CROSS REFERENCE TO PRIOR APPLICATION

This application claims priority to Korean Patent Application No. 10-2014-0078684 (filed on Jun. 26, 2014), which is hereby incorporated by reference in its entirety.

BACKGROUND OF THE INVENTION

Field of the Invention

The present invention relates to a one time password generation device and an authentication method using the same, and more particularly, to a one time password generation device and an authentication method using the same that can perform user authentication by generating a one time password in order to input a password having different lengths and values every time using a terminal.

Description of the Related Art

In general, a user authentication system is a system that authenticates a user by inputting Identification (ID) and a password designated by a user.

In such a conventional user authentication system, because user authentication should be performed with a fixed password, when a terminal is hacked or when a password is exposed to the outside, damage such as user personal information leakage occurs and because a password should be periodically changed, there is a problem that user inconvenience is caused.

Further, a conventional One Time Password (OTP) performs user authentication using a one time password of randomly generated random numbers, and because a user should use an OTP token, which is hardware that generates a one time password, a cost for purchasing a separate device increase, and the user should carry the OTP token and thus there is a problem that the user cannot conveniently use the OTP token.

In addition, in a biometrics method for user authentication, there is a problem that much cost occurs in constructing a system.

A conventional authentication system determines whether one or two authentication information submitted by a user corresponds with user authentication information in which the user previously stores, and when a corresponding authentication element is exposed or leaked to another person, or is deprived by another person, there is a problem that authentication information cannot determine an illegal user. Further, it becomes a final object target of hacking that a hacker (illegal user) successfully deprives authentication information, and the authentication information becomes a main attack target of the hacker, and when one or two authentication information submitted by the user is deprived by the hacker, the hacker having corresponding authentication information may illegally use personal information of another person and thus due to a weak point and a harmful effect of a single authentication system, a security problem occurs and damage rapidly increases.

In a method and system for registering and authenticating a one time password having reinforced voluntariness disclosed in Korean Patent No. 1,204,980, a one time password is generated using a session key, an initial value, and the login number of an OTP terminal, but there is a problem that a separate OTP terminal should be provided.

In a user authentication method of using a plurality of one time passwords disclosed in Korean Patent No. 1,272,349, a smart device registered as a mobile OTP device generates a plurality of one time passwords to output each one time password to a display unit and thus another person may be prevented from illegally using a one time password, and when the one time password is used or when a predetermined time has elapsed, by immediately discarding the one time password, hacking can be prevented and damage according to multiple access can be prevented, but there is a problem that a separately registered OTP terminal should be provided and authentication should be performed.

In a device and method for generating a one time password using a virtual input means disclosed in Korean Patent No. 1,359,874, because a length of a password cannot be changed, a research for a one time password generation device that can change a length of a password is requested.

CONVENTIONAL ART DOCUMENT

Patent Document (Patent Document 1) Korean Patent No. 1,204,980
(Patent Document 2) Korean Patent No. 1,272,349
(Patent Document 3) Korean Patent No. 1,359,874

SUMMARY OF THE INVENTION

The present invention has been made in view of the above problems, and provides a one time password generation device and an authentication method using the same using a virtual input means that sets reference information in which only a user can know and that enables the one time password generation device to generate one time passwords according to the information and that enables to input a password in a predetermines direction through a virtual input means and that enables to obtain and input information of a one time password using a user terminal without a separate OTP generator.

The present invention further provides a one time password generation device and an authentication method using the same that form a use environment and a behavioral characteristic of a user in a cyberspace in data and processing an authentic element by introducing digital montage authentication technology and that form the data into a multi-aspect and multiple authentication system of the user and that use the system as additional step in an existing single authentication system and that make illegal use attempt of an illegal user (hacker) difficult and that enable to originally block the attempt by providing an additional authentication system for the user even in a worst case in which user authentication information is deprived, and that secure safety and complementation of a computing system and an important information resource.

The object of the present invention is not limited to the above-described objects and the other objects will be understood by those skilled in the art from the following description.

In accordance with an aspect of the present invention, a one time password generation device for user authentication includes: a reference information generator that generates reference information; a virtual input means generator that generates a virtual input means in which a blank is provided; and a password generator that generates a one time password using an initial value, reference information, and a blank.

In accordance with another aspect of the present invention, an authentication method using a one time password generation device includes: performing primary authentication using a one time password generation device provided in a terminal; performing secondary authentication that determines whether digital montage corresponds with a user pattern by comparing; and requesting third authentication to terminal in which a user is previously registered, when a pattern does not correspond at the performing of secondary authentication.

Advantage

According to the present invention, because user damage due to password hacking or leakage can be beforehand prevented through use of a one time password, a user can more safely perform user authentication.

Further, because a separate OTP generator is unnecessary, the user can conveniently use, and because a one time password may be generated using a one time password generation device, a cost can be reduced.

Further, even if a user password is exposed to the outside, a password is regenerated based on identification information in which only the user may know and thus the user can more safely use.

Because a length of a password can be changed using a blank, the password can be more safely input.

DETAILED DESCRIPTION OF EXEMPLARY EMBODIMENTS

Figure 1:
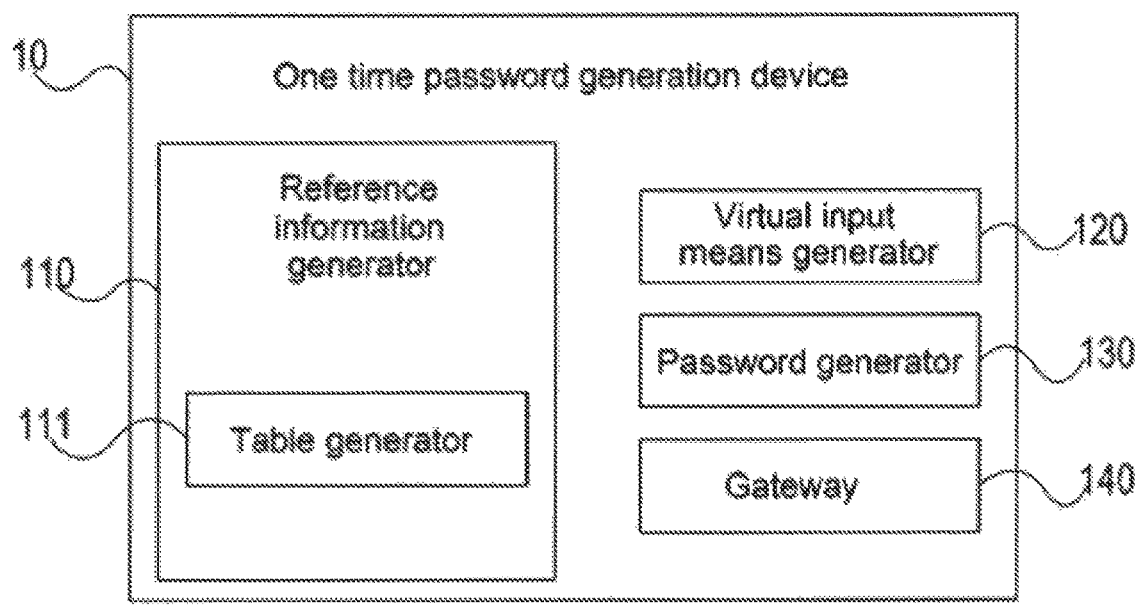
FIG. 1 is a block diagram illustrating a configuration of a one time password generation device according to an exemplary embodiment of the present invention.

Hereinafter, an exemplary embodiment according to the present invention will be described in detail with reference to the drawings. A size or shape of constituent elements shown in the drawings may be exaggeratingly displayed for clarity and convenience of a description. Further, specially defined terms in consideration of a configuration and operation of the present invention may vary depending on a user's or an operator's intension and usage. The terms used herein should be understood based on the descriptions made herein. The spirit and scope of the present invention are not limited to a suggested exemplary embodiment, and a person of ordinary skill in the art that understands the spirit and scope of the present invention may easily perform another exemplary embodiment within a range of the same spirit and scope, and the another exemplary embodiment belongs to a range of the present invention.

FIG. 1 is a block diagram illustrating a configuration of a one time password generation device according to an exemplary embodiment of the present invention. Hereinafter, the one time password generation device according to an exemplary embodiment of the present invention will be described with reference to FIG. 1.

A one time password generation device 10 according to the present exemplary embodiment may be implemented with software, hardware, or a combination thereof.

The one time password generation device 10 according to the present exemplary embodiment includes a reference information generator 110, a virtual input means generator 120, and a password generator 130.

In the present exemplary embodiment, the reference information generator 110 generates reference information. The reference information is generated by user designation, is not always limited thereto, and is provided in a table shape that can designate a cell to enable a user to acquire user intrinsic reference information. Specifically, the reference information generator 110 has a table generator 111 that can generate a table, and the table generator 111 provides a table to the user, and in the table, information corresponding to a cell designated by the user is generated as reference information, and when the user inputs a one time password, the reference information generator 110 provides reference information to input the password. Reference information is information that enables a user to estimate a generated one time password based on an initial value of a password, enables the user to estimate a password with numeral information and direction instruction information instructing a specific direction, and enables to input a one time password. More specifically, the reference information generator 110 has a dummy key (false value) and together provides a dummy key of another table instead of reference information of a location designated by the user. The reference information generator 110 lowers password leakage danger by enabling only the user to acquire reference information and thus a password can be more safely used.

The virtual input means generator 120 generates a virtual input means in which a blank is provided. The virtual input means is a virtual keyboard, and the blank is provided to more variously provide a password. The virtual input means may be provided with a virtual keyboard having at least one input key. The blank is provided between an input key and an input key of the virtual input means to prevent from providing a virtual keyboard of a constant arrangement with a method in which an existing virtual keyboard provides. When reference information of the reference information generator 110 instructs a blank of the virtual input means generator 120, the one time password generator 130 omits generation of a password corresponding to a blank or generates a random imaginary number. When using the blank, a length (the number of characters or numerals) of a password that may be leaked to the outside upon inputting a password is varied and thus the password may be more safely inputted. That is, when inputting a password using the reference information, if reference information that instructs a blank segment exists, an input to a blank portion may be omitted or an imaginary number may be input. Even if any character of the virtual input means is input, an imaginary number may lower a risk of password leakage by enabling to recognize the character with the password. Further, the virtual input means has at least one input key, and whenever the input key is used, an arrangement of the input key is changed.

The password generator 130 generates a one time password using an initial value, reference information, and a blank. The initial value is a password previously determined for user authentication and is a value previously set by the user. The password generator 130 generates a changed one time password using an instruction value (specific direction instruction information and numeral information) representing in reference information based on an initial value, and when the instruction value instructs a blank of a virtual input means, a value of the blank is omitted or in order to input a password by inputting an imaginary number, the password generator 130 generates a one time password. The user may input a one time password using an instruction value acquired with reference information. When a one time password generated in the one time password generator 130 and a password in which the user inputs using a virtual input means correspond, user authentication is complete. The password of the password generator 130 may be stored at a memory unit to be described later.

Figure 2:
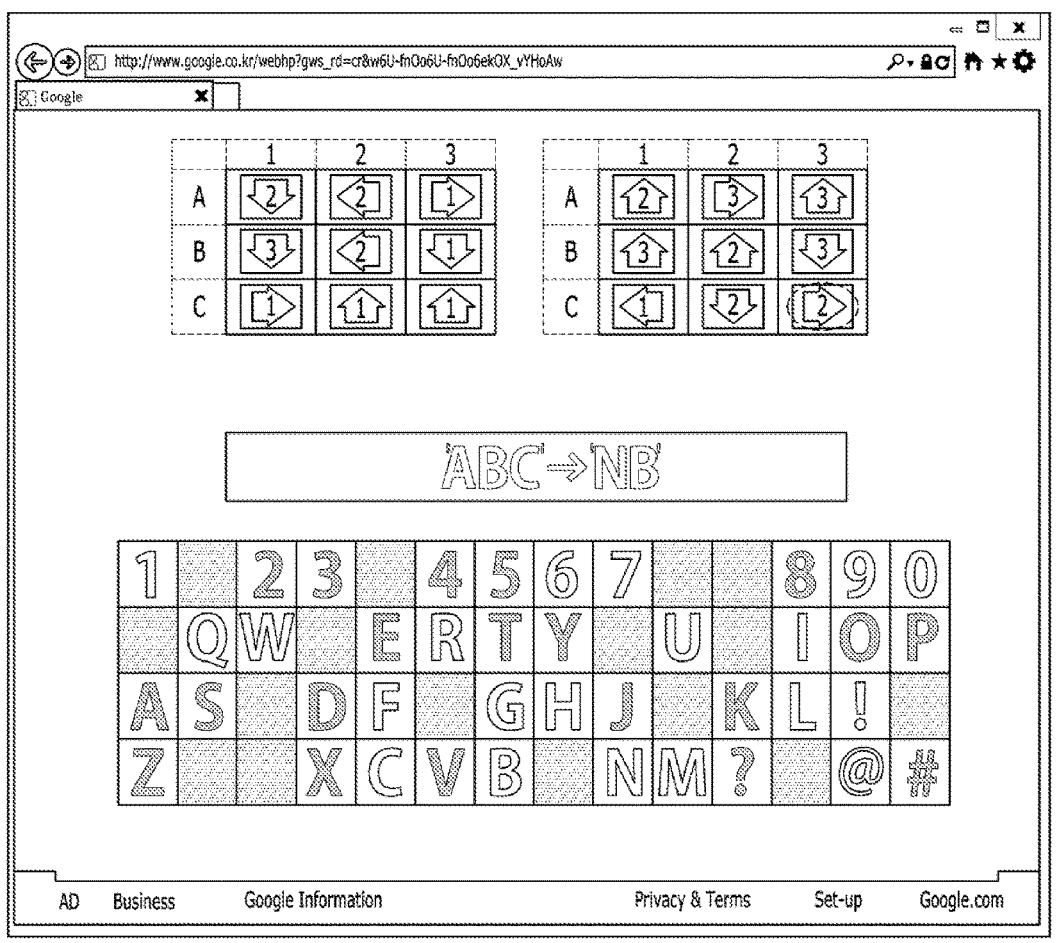
FIG. 2 is a diagram illustrating an example of a one time password input using a virtual input means and a table of a one time password generation device according to an exemplary embodiment of the present invention.

In an exemplary embodiment of the present invention, referring to FIG. 2, when an initial value is "ABC" and when reference information is information representing movement by two cells to the right side (see a dotted circle of a table of FIG. 2), a one time password is generated with "NB". That is, only when the user inputs "NB", user authentication may be performed. In more detail, because reference information represents an instruction value moving by two cells to the right side, a value corresponding to an initial value "A", a blank moved by two cells to the right side from an initial value "A" of a virtual input means becomes a value corresponding to a one time password. In this case, because the blank is represented, the user omits an input. Because an initial value "B" is moved by two cells to the right side to represent "N", the user inputs "N", and because an initial value "C" is moved by two cells to the right side to represent "B", it is necessary for the user to input "B". That is, a one time password is generated with "NB", and only when the user inputs "NB", user authentication may be performed.

Further, when a character or a numeral is located in an end portion of the virtual input means, if an instruction value of two cells to the right side is generated, a character or a numeral of an opposite direction may be counted and input. In a preferable embodiment, when an initial value is "P", if an instruction value of movement by two cells to the right side is output as reference information, it is necessary to input "Q".

In another exemplary embodiment of the present invention, reference information is generated with a location, an order designated by a user, or is generated by other terminals. That is, reference information is designated by a user and a location thereof may be selected, and as reference information is determined in order, an information value may be selected in plural, and by providing reference information generated by other terminals to a user terminal or a server, the user may acquire reference information. In this case, as a reference information generator is provided to other terminals, reference information is provided to the user terminal. Alternatively, the reference information generator 110 is provided to both the user terminal and another terminal and may be used.

In another exemplary embodiment of the present invention, a blank may be provided with at least one selected from a group consisting of an image, a symbol, and a color. Therefore, the blank is formed for the user to more simply recognize to be effectively used.

Further, a combination consisting of at least one of an image, a symbol, and a color previously specially designated by the user may be used as a user recognition index for determining phishing prevention, enables the user to determine whether a corresponding image exists within a virtual keyboard therethrough or whether a site is genuine through the display number, thereby distinguishing a phishing site and thus a site can be more safely used.

In another exemplary embodiment of the present invention, the one time password generation device 10 is provided in a server or a user terminal. The one time password generation device 10 enables the user to apply and use in various devices.

In another exemplary embodiment of the present invention, whenever a virtual input means is used, an arrangement of the virtual input means is changed. That is, when the virtual input means is continuously changed and used, by enabling to use a virtual input means of another arrangement, a password is prevented from being leaked to the outside.

In another exemplary embodiment of the present invention, whenever a user performs authentication, reference information is changed. That is, reference information is not fixed but is changed to various instruction values to enable to generate different one time passwords every time. Reference information prevents a password from being leaked to the outside.

In another exemplary embodiment of the present invention, a gateway 140 converts a one time password to an initial value. Although an existing password is used, by enabling to use a one time password, the gateway 140 enables to more efficiently use the one time password generation device 10. The gateway 140 acquires an existing initial value to generate a one time password, and the gateway 140 converts an input one time password and compares the converted one time password with an initial value, and when the converted one time password is the same as an initial value, the gateway 140 performs user authentication, and when the converted one time password is not the same as an initial value, the gateway 140 may stop user authentication. The gateway 140 enables to maintain and use a conventional device or system and thus an installation cost for using a one time password can be reduced.

In another exemplary embodiment of the present invention, a value corresponding to instruction information is a slope or shaking value generated by a slope and shaking detection unit when leaning or shaking the one time password generation device 10. The detection unit is included in the one time password generation device 10 and detects a slope and shaking value in the one time password generation device 10. The detection unit variously forms instruction information to be selected according to user convenience and enables to acquire instruction information. The detection unit is formed with a gyro sensor, an acceleration sensor, and a touch sensor to enable to generate a slope or shaking value.

The user terminal may be a mobile terminal or a terminal, and the mobile terminal may include a mobile phone, a smart phone, a laptop computer, a digital broadcasting terminal, Personal Digital Assistants (PDA), a Portable Multimedia Player (PMP), and a navigation device. However, a person of ordinary skill in the art may easily know that a configuration according to an exemplary embodiment described in this specification can be applied to a fixed terminal such as a digital TV and a desktop computer, except for a case that can be applied only to a terminal. Further, the one time password generation device 10 may be provided and used within the terminal.

The terminal includes a controller, a communication unit, an input unit, an output unit, a data storage unit, an interface unit, and a power supply unit.

The controller performs an entire control of the terminal. For example, the controller performs a control and processing related to an input and output of a one time password received from the communication unit information.

The communication unit may include at least one module that enables wireless communication between the terminal and user DB or between the terminal and a network at which the terminal is located. The communication unit transmits and receives a wired/wireless signal. The wireless signal may include data of various forms according to transmission and reception of a voice call signal, an audiovisual communication call signal, or a character/multimedia message. The communication unit may transmit and receive a control instruction that can control the one time password generation device 10 using a virtual input means. The communication unit uses short range communication technology. Specifically, the communication unit uses one selected from a group consisting of Wireless-Fidelity (WiFi), Bluetooth, Radio Frequency Identification (RFID), and infrared Data Association (IrDA). Further, the communication unit includes a broadcasting receiving module, a mobile communication module, and a location information module.

The input unit generates input data necessary when a user controls a terminal operation. Further, the input unit may generate input data for inputting a one time password. The input unit may receive a signal that designates two or more contents among contents displayed according to the present invention from the user. The signal that designates two or more contents may be received through a touch input or may be received through an input of a hard key and a soft key. The input unit may receive an input that selects at least one content from the user. Further, the input unit may receive an input that generates an icon related to a function in which the terminal can perform from the user. The input unit may include a direction key, a key pad, a dome switch, a touch pad (capacitive/resistive), a jog wheel, and a jog switch.

The output unit generates an output related to visual sense, auditory sense, or tactile sense and may include a display unit, an audio output module, an alarm unit, and a haptic module.

The display unit displays (outputs) information processed in the terminal. For example, when the terminal receives information related to a one time password, the display unit displays a User Interface (UI) or a Graphic User Interface (GUI) related to the one time password. Further, the display unit according to the present exemplary embodiment supports 2D and 3D display modes. That is, the display unit according to the present exemplary embodiment may have a configuration that combines switch liquid crystal in a general display device. The display unit controls an advancing direction of light by operating an optical parallax barrier using switch liquid crystal and may be separated so that different light arrives at left and right eyes. Therefore, when a combined image of an image for a right eye and an image for a left eye is displayed in a display device, an image corresponding to each eye is viewed to the user and thus the user feels that the image is three-dimensionally displayed. That is, the display unit does not drive the switch liquid crystal and optical parallax barrier in a 2D display mode state but drives only the display device according to the control of the controller, thereby performing a general 2D display operation.

Further, by driving the switch liquid crystal, the optical parallax barrier, and the display device in a 3D display mode state according to the control of the controller, the display unit drives only the display device to perform a 3D display operation.

The display unit may include at least one of a liquid crystal display (LCD), a thin film transistor-liquid crystal display (TFT LCD), an organic light-emitting diode (OLED), a flexible display, and a three-dimensional display (3D display). Some displays thereof may be formed in a transparent display or a light transmitting display so as to view the outside therethrough. This is referred to as a transparent display, and a representative example of the transparent display is a Transparent OLED (TOLED). A rear structure of the display unit may be a light transmitting structure. By such a structure, the user can view a thing located at the rear side of a terminal body through an occupying area of the display unit of the terminal body.

At least two display units may exist according to an implementation of the terminal. For example, in the terminal, a plurality of display units may be separated at one surface or may be integrally disposed, and at different surfaces, each display unit may be disposed.

When the display unit and a sensor (hereinafter, referred to as a 'touch sensor') that detects a touch action form an interlayer structure (hereinafter, referred to as a 'touch screen'), the display unit may be used as an input device in addition to an output device. The touch sensor may have, for example, a form of a touch film, a touch sheet, and a touch pad.

The touch sensor may convert a change of a pressure applied to a specific portion of the display unit or capacitance occurring in a specific portion of the display unit to an electrical input signal. The touch sensor may detect a pressure upon touching as well as a touch location and a touch area.

When a touch input to the touch sensor exists, a signal(s) corresponding thereto is(are) sent to a touch controller (not shown). After processing the signal(s), the touch controller transmits corresponding data to the controller. Thereby, the controller may know an area in which the display unit is touched.

The proximity sensor may be disposed in an internal area of the terminal enclosed by the touch screen or at a periphery of the touch screen. The proximity sensor is a sensor that detects without a mechanical contact using an electromagnetic force or infrared ray whether a material approaching to a predetermined detection surface exists or whether a material exists at a periphery. The proximity sensor has a lifespan longer than that of a contact sensor and is widely used.

The proximity sensor may include, for example, a transmissive photoelectric sensor, a direct reflective photoelectric sensor, a mirror reflective photoelectric sensor, a high frequency oscillating proximity sensor, a capacitive proximity sensor, a magnetic proximity sensor, and an infrared ray proximity sensor. When the touch screen is a capacitive touch screen, the proximity sensor detects proximity of the pointer with a change of an electric field according to proximity of the pointer. In this case, the touch screen (touch sensor) may be classified into a proximity sensor.

Hereinafter, for convenience of description, as a pointer approaches without contact on the touch screen, an action that recognizes that the pointer is located on the touch screen is referred to as a "proximity touch", and an action in which a pointer actually contacts on the touch screen is referred to as a "contact touch". A location in which a proximity touch is performed with a pointer on the touch screen is a location in which the pointer corresponds vertically to the touch screen, when the pointer performs a proximity touch.

The proximity sensor detects a proximity touch and a proximity touch pattern (e.g., a proximity touch distance, a proximity touch direction, a proximity touch speed, a proximity touch time, a proximity touch location, and a proximity touch moving state). Information corresponding to the detected proximity touch action and proximity touch pattern may be output on the touch screen.

The audio output module may output audio data received from the communication unit or stored at a data storage unit to be described later in a call signal receiving mode, a communication mode or a recording mode, a voice recognition mode, and a broadcasting receiving mode. The audio output module may output an audio signal related to a function (e.g., a call signal receiving sound, a message receiving sound) performed in the terminal. Such an audio output module may include a receiver, a speaker, and a buzzer.

The alarm unit outputs a signal notifying that an event occurs in the terminal. The event occurring in the terminal may include, for example, call signal reception, message reception, a key signal input, and a touch input. The alarm unit may output a signal notifying that an event occurs with other forms, for example, a vibration in addition to a video signal or an audio signal. Because the video signal or the audio signal may be output through the display unit or the voice output module, in this case, the display unit and the voice output module may be classified as the kind of the alarm unit.

The haptic module generates various tactile sense effects in which a user may feel. A representative example of a tactile sense effect in which the haptic module occurs is a vibration. Intensity and pattern of a vibration in which the haptic module occurs may be controlled. For example, different vibrations may be synthesized and output or may be sequentially outputted.

The data storage unit may store a program for a processing and control of the controller and may perform a function for temporally storing input/output data (e.g., history, location information, and time of one time password). At the data storage unit, a use frequency of each of the data may be together stored. Further, the data storage unit may store data on a vibration and audio of various patterns output upon inputting a touch on the touch screen. Further, the data storage unit stores a web browser that displays a 3D or 2D webpage according to the present invention. A data storage unit may include a storage medium of at least one type of a flash memory type, a hard disk type, a multimedia card micro type, a card type memory (e.g. SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The terminal may operate to be related to a web storage that performs a storage function of the data storage unit on Internet.

The interface unit performs a passage function to entire external devices connected to the terminal. The interface unit receives data from the external device or receives power to transfer power to each element within the terminal, and transmits data within the terminal to the external device. For example, a wired/wireless headset port, an external charger port, a wired/wireless data port, a memory card port, a port that connects a device having an identity module, an audio Input/Output (I/O) port, a video I/O port, and an earphone port may be included in the interface unit.

The power supply unit receives power of the outside and power of the inside by the control of the controller to supply power necessary for operation of each element.

Figure 3:
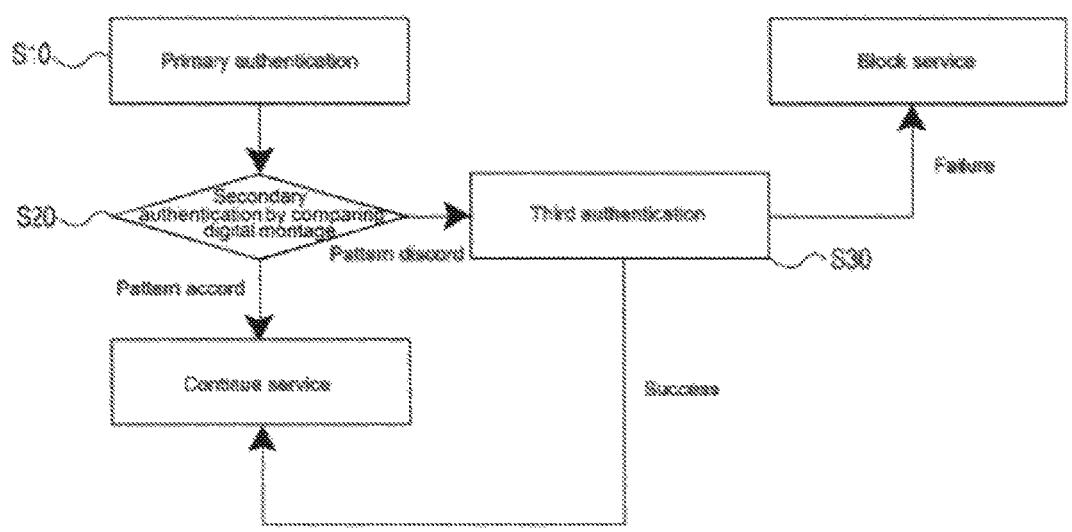
FIG. 3 is a flowchart illustrating an authentication method using a one time password according to an exemplary embodiment of the present invention.

Referring to FIG. 3, an authentication method of using the one time password generation device 10 according to an example embodiment of the present invention includes step of performing primary authentication (S10), step of performing secondary authentication by comparing digital montage (S20), and step of requesting third authentication (S30).

In another example embodiment of the present invention, step (S10) of performing primary authentication performs authentication using the one time password generation device 10 provided in the terminal. Step S10 of performing authentication using the one time password generation device 10 performs authentication using the described technology of the one time password generation device 10.

Step S20 of performing secondary authentication by comparing digital montage is step of determining whether a user pattern corresponds by comparing digital montage. Digital montage is to grasp a user pattern using at least one information selected from a group consisting of network information, system information, and access application information of the terminal, terminal use time information, favorite program information, touch information, and input speed information. That is, a normal terminal use pattern of the user is processed into a data value using the foregoing digital montage information and a user general pattern is thus grasped. Because this uses various information, authentication having more improved complementation may be provided, compared with when performing user authentication only with conventional one or two information. Further, because the user may use the terminal with a method in which the user normally uses instead of separate authentication, the user may use more simply and conveniently the terminal.

In an conventional cyber authentication method, when authentication (login) is performed by inputting ID and PASSWORD, a user may easily access to a website or the terminal, but because an actual inspection of user authentication (determining a user by combining various environments) is not performed, authentication on a cyberspace is easily illegally used and is abused. In order to compensate user authentication easily illegally used on a cyberspace, user authentication is performed using digital montage and various information (big data). Digital montage enables to solve a problem of an existing authentication method and to more simply perform user authentication using at least one information selected from a group consisting of network information, system information, and access application information of the terminal, terminal use time information, favorite program information, touch information, and input speed information.

Digital montage technology is an authentication system that gathers a user's characteristic element such as a user's use environment, behavior, and habit with a multiple and that continuously arranges the user's characteristic elements and that changes the continuously arranged user's characteristic elements to a unique authentic pattern element value in which only the user has and that generates the changed value into a series of histogram that can compare with a unique authentic pattern element value of another person and that thus additionally determines whether the user accesses and may be used to a user who accesses after authentication.

At step S20 of secondarily authenticating digital montage, when a pattern does not correspond, the third authentication step S30 is step of requesting third authentication to a terminal in which the user previously registers. Third authentication is to request third authentication to a terminal in which the user previously registers, i.e., a terminal in which only the user can access and it is not always limited thereto and may be provided in a mobile terminal of the user. Third authentication enables to transmit data that can determine whether the user normally uses the terminal to a mobile terminal in which only the user can use and enables the user to continuously use the terminal by authenticating the user as a normal user, when the user determines data. Third authentication may be performed with a method of performing authentication through a text message service or a method of re-inputting a one time password, and when such third authentication is failed, it is regarded as a user authentication failure, and by blocking service access of the terminal, damage that may occur by hacking can be reduced. Third authentication may be performed by performing an input for authentication in a mobile terminal of the user. When a terminal use pattern of the user is determined as an illegal user, a server may transmit a message, warning, and data of authentication determination for third authentication to the mobile terminal, notify the user of transmission, and request third authentication.

In another exemplary embodiment of the present invention, network information is at least one information selected from a group consisting of IP, an access region, a communication company, a processing speed, a Multi Access Computer (MAC), and network card information. This may be used as information that grasps a user pattern using various information and that makes digital montage. That is, by making a constant threshold value with a complex element, the user may determine whether the constant threshold value corresponds with a user pattern.

In another exemplary embodiment of the present invention, system information is at least one information selected from a group consisting of an operation system kind, operation system version, a system processing speed, a resolution, CPU ID, and GPU information of a terminal. The system information may be used as information that grasps a user pattern like the foregoing network information and that makes digital montage.

In another exemplary embodiment of the present invention, access application information is at least one information selected from a group consisting of application version, kind, the installation plugin number, environment setting, a language, and a font. The access application information may be used as information that grasps a user pattern and that makes digital montage like the foregoing network information and system information.

That is, by generating digital montage that may make a user pattern into a numeral value using the network information, system information, and application information, the user may be multilaterally determined and thus user authentication may be more stably and accurately performed, compared with when performing authentication using only existing one or two information. Network information, system information, and application information is formed in data and a threshold value is set, and when a user pattern exceeding the threshold value occurs, the user is determined as an illegal user (hacker) or a unauthorized user, and third authentication is performed and thus only an authorized user can control the terminal. When third authentication is passed, it is recognized that a user pattern is changed and an added user pattern may be reset as digital montage.

In another exemplary embodiment of the present invention, digital montage information is stored in a histogram, a user's terminal use pattern is compared with the histogram, and when the user's terminal use pattern exceeds a threshold value of discordance, third authentication is performed. The histogram enables to more easily grasp and compare digital montage information. By comparing digital montage information and a user's terminal use pattern, when the digital montage information is different from the user's terminal use pattern by a constant numeral value or more, for example, when the terminal accesses using different communication company and different operation system at the same access region, it is determined that a threshold value of discordance is exceeded and third authentication is performed. When a majority of information of a histogram does not correspond, it may be determined that a threshold value of discordance is exceeded, but it is not always limited thereto and it may be changed according to a user practice.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

DESCRIPTION OF SYMBOLS

10: one time password generation device
110: reference information generator
111: table generator
120: virtual input means generator
130: password generator
140: gateway
S10: first authentication step
S20: secondary authentication step
S30: third authentication step

What is claimed is:

1. A one-time password generation device for involving a user in creating one time password for user authentication, comprising:
   a memory configured to store the one time password created;
   a reference information generator (110) that generates reference information responding to the user's request, wherein the reference information generator displays a picture of a group of cells on a hardware screen, thus allowing the user to choose a desired cell of the group of cells, each of the cells representing a symbol indicating a direction for a user to move each character of an original password from a preset location where the each character is to be entered in and the number of spaces to move the each character along the direction each time the user enters the each character;
   a virtual keyboard (120) having a plurality of virtual character keys including at least one blank, the virtual keyboard (120) being displayed on the hardware screen so as to allow the user to enter and modify the original password; and
   a password generator (130) that generates the one-time password using the original password and the reference information to verify the user's password entered,
   wherein the password generator converts the each character of an original password to a corresponding character comprising the one time password each time based on the direction and the number of spaces the user has chosen; and,
   wherein the password generator determines a length of the one time password by omitting to generate a portion of the one-time password that corresponds to the blank displayed on the virtual keyboard the each time.

2. The one-time password generation device of claim 1, wherein the original password is a password previously determined for user authentication.

3. The one time password generation device of claim 1, wherein the reference information generator (110) generates reference information by designation of a user.

4. The one time password generation device of claim 1, wherein the password generator (130) generates a random imaginary number, when reference information of the reference information generator (110) instructs a second blank of the virtual keyboard (120).

5. The one time password generation device of claim 1, wherein the reference information is generated by a location, an order designated by a user, or another terminal.

6. The one time password generation device of claim 1, wherein the reference information generator (110) comprises a table generator (111) that generates a table in which a user can designate a cell and generates information corresponding to a cell designated by the user as reference information in the table.

7. The one time password generation device of claim 1, wherein the reference information comprises a dummy key.

8. The one time password generation device of claim 1, wherein the reference information comprises direction instruction information and numeral information instructing a specific direction.

9. The one time password generation device of claim 4 wherein the second blank is at least one selected from a group consisting of an image, a symbol, and a color.

10. The one time password generation device of claim 1, wherein the one time password generation device (10) is a server or a user terminal.

11. The one time password generation device of claim 1, wherein the virtual keyboard (120) has at least one input key, and the input key has a changed arrangement whenever using.

12. The one time password generation device of claim 1, wherein the reference information is changed whenever performing user authentication.

13. The one time password generation device of claim 1, further comprising a gateway (140) that converts the one time password to an initial value.

14. An authentication method using a one time password generation device, the authentication method comprising:
performing primary authentication (S10) using a one time password generation device in a terminal;
performing secondary authentication (S20) that determines whether digital montage corresponds with a user pattern by comparing; and
requesting third authentication (S30) to terminal in which a user is previously registered, when a pattern does not correspond at the performing of secondary authentication,
wherein the one time password generation device comprises:
a memory configured to store the one time password created;
a reference information generator (110) that generates reference information responding to the user's request, wherein the reference information generator displays a picture of a group of cells on a hardware screen, thus allowing the user to choose a desired cell of the group of cells, each of the cells representing a symbol indicating a direction for a user to move each character of an original password from a preset location where the each character is to be entered in and the number of spaces to move the each character along the direction each time the user enters the each character;
a virtual keyboard (120) having a plurality of virtual character keys including at least one blank, the virtual keyboard (120) being displayed on the hardware screen so as to allow the user to enter and modify the original password; and
a password generator (130) that generates the one time password using the original password and the reference information to verify the user's password entered,
wherein the password generator converts the each character of an original password to a corresponding character comprising the one time password each time based on the direction and the number of spaces the user has chosen; and,
wherein the password generator determines a length of the one time password by omitting to generate a portion of the one-time password that corresponds to the blank displayed on the virtual keyboard the each time.

15. The authentication method of claim 14, wherein the digital montage is at least one information selected from a group consisting of network information, system information, access application information, terminal use time information, favorite program information, touch information, and input speed information of the terminal.

16. The authentication method of claim 15, wherein the network information is at least one information selected from a group consisting of IP, an access region, a communication company, a processing speed, a Multi Access Computer (MAC), and network card information.

17. The authentication method of claim 15, wherein the system information is at least one information selected from a group consisting of an operation system kind, operation system version, a system processing speed, a resolution, CPU ID, and GPU information of the terminal.

18. The authentication method of claim 15, wherein the access application information is at least one information selected from a group consisting of application version, a kind, the installation plugin number, environment setting, a language, and a font.

19. The authentication method of claim 14, wherein the digital montage information is stored in a histogram, and third authentication is performed, when a terminal use pattern of a user exceeds a threshold value of discord by comparing the terminal use pattern of the user with a histogram.

* * * * *